United States Patent
Liu et al.

(10) Patent No.: US 10,763,943 B2
(45) Date of Patent: Sep. 1, 2020

(54) METHOD AND APPARATUS FOR NON-CODEBOOK BASED UPLINK MULTIPLE-INPUT AND MULTIPLE-OUTPUT

(71) Applicant: Futurewei Technologies, Inc., Plano, TX (US)

(72) Inventors: Bin Liu, San Diego, CA (US); Pengfei Xia, San Diego, CA (US); Richard Stirling-Gallacher, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/821,338

(22) Filed: Nov. 22, 2017

(65) Prior Publication Data

US 2018/0367205 A1 Dec. 20, 2018

Related U.S. Application Data

(60) Provisional application No. 62/520,861, filed on Jun. 16, 2017.

(51) Int. Cl.
*H04L 12/50* (2006.01)
*H04B 7/06* (2006.01)
(Continued)

(52) U.S. Cl.
CPC ......... *H04B 7/0695* (2013.01); *H04B 7/0486* (2013.01); *H04L 5/0048* (2013.01);
(Continued)

(58) Field of Classification Search
CPC ...................................................... H04L 12/50
(Continued)

(56) References Cited

U.S. PATENT DOCUMENTS

2013/0142128 A1 6/2013 Yang et al.
2018/0234959 A1* 8/2018 Ahn .................... H04W 72/046

FOREIGN PATENT DOCUMENTS

CN 102083033 A 6/2011
CN 102595385 A 7/2012
(Continued)

OTHER PUBLICATIONS

Nokia, et al., "UL SRS design considerations in NR", 3GPP TSG-RAN WG1 Meeting #87, Ri-1612861, Reno, USA, Nov. 14-18, 2016, 6 pages.
(Continued)

*Primary Examiner* — Dang T Ton
(74) *Attorney, Agent, or Firm* — Slater Matsil, LLP

(57) ABSTRACT

A method and an apparatus for selecting beams for non-codebook based uplink multiple-input and multiple-output are disclosed. In an embodiment, a method implemented by a user equipment (UE) includes receiving an allocation of at least one sounding reference signal (SRS) resource in an uplink subframe from a transmission and reception point (TRP) for a first set of uplink transmission beams, transmitting precoded SRSs in the at least one SRS resource to the TRP, wherein the precoded SRSs are precoded with UE-selected precoders and at least one rank and receiving an identification of two or more precoders for a second set of uplink transmission beams, wherein the second set of uplink transmission beams is selected from the first set of uplink transmission beams, and wherein the two or more precoders are based on the precoded SRSs.

22 Claims, 3 Drawing Sheets

(51) Int. Cl.
  *H04B 7/0456* (2017.01)
  *H04L 5/00* (2006.01)
  *H04W 72/06* (2009.01)
  *H04W 24/10* (2009.01)
  *H04W 72/04* (2009.01)

(52) U.S. Cl.
  CPC ......... *H04W 24/10* (2013.01); *H04W 72/046* (2013.01); *H04W 72/06* (2013.01)

(58) Field of Classification Search
  USPC ....................................................... 370/329
  See application file for complete search history.

(56) References Cited

FOREIGN PATENT DOCUMENTS

| | | |
|---|---|---|
| CN | 103945541 A | 7/2014 |
| EP | 2552169 A1 | 1/2013 |
| WO | 2016114696 A1 | 7/2016 |

OTHER PUBLICATIONS

Huawei, et al., "UL SRS design for beam management, CSI acquisition", 3GPP TSG RAN WG1 Meeting #89, RI-1706938, Hangzhou, China, May 15-19, 2017, 9 pages.

Nokia, et al., "UL SRS design considerations in NR", 3GPP TSG RAN WG1 #89, R1-1708928, Hangzhou, P.R. China, May 15-19, 2017, 7 pages.

3GPP TR 38.802, V14.2.0 (Sep. 2017), "3rd Generation Partnership Project; Technical Specification Group Radio Access Network; Study on New Radio Access Technology Physical Layer Aspects (Release 14)", Sep. 2017, 143 pages.

Huawei et al., "Non codebook based transmission for UL MIMO", 3GPP TSG RAN WG1 Meeting #89, R1-1706923, May 15-19, 2017, 6 pages, Hangzhou, China.

Ericsson, "Non-codebook based UL MIMO remaining details", 3GPP TSG-RAN WG1 #91, R1-1720739, Nov. 27, 2017-Dec. 1, 2017, 6 Pages, Reno, USA.

\* cited by examiner

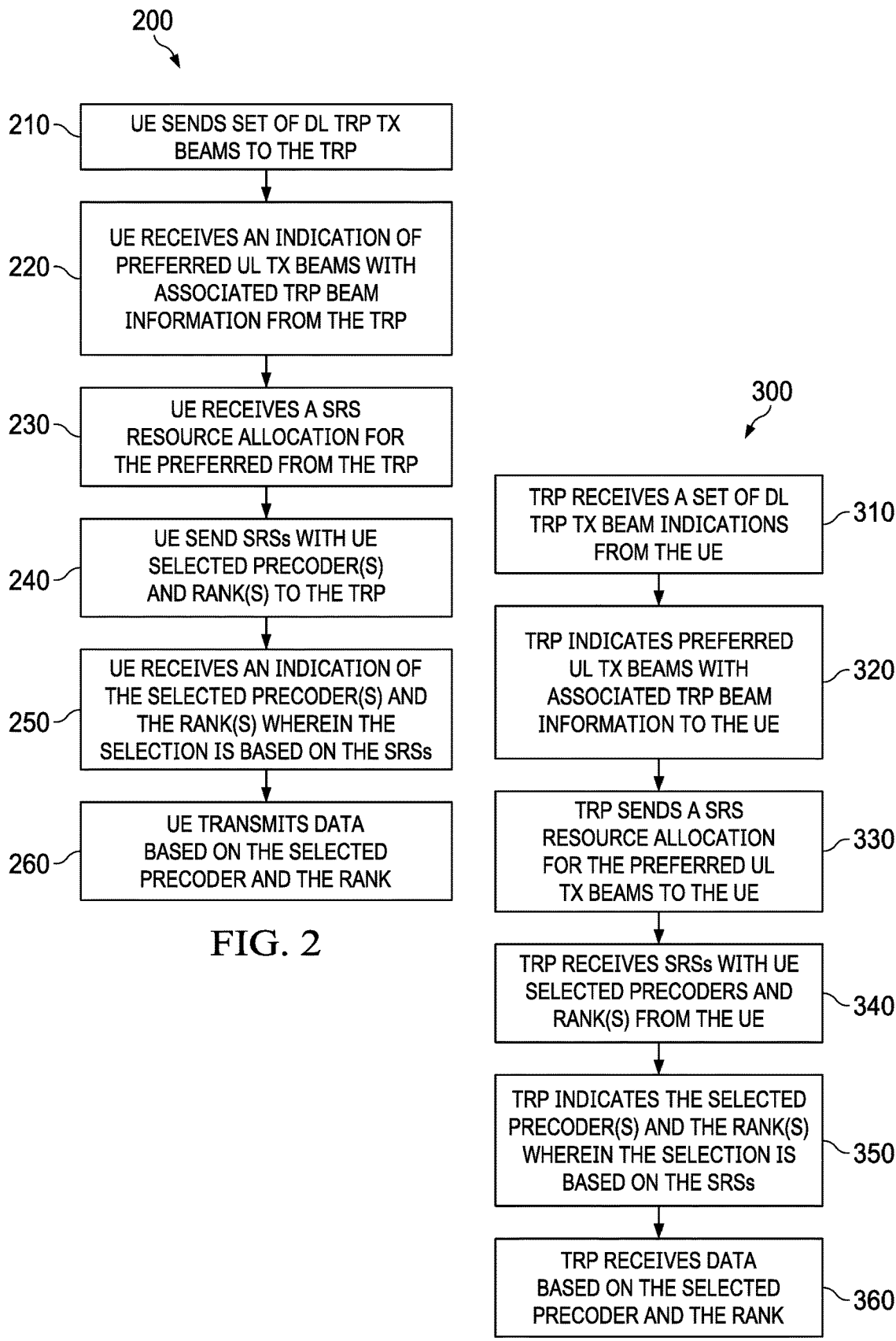

METHOD AND APPARATUS FOR NON-CODEBOOK BASED UPLINK MULTIPLE-INPUT AND MULTIPLE-OUTPUT

CROSS-REFERENCE TO RELATED APPLICATIONS

This application claims the benefit of U.S. Provisional Application No. 62/520,861, filed on Jun. 16, 2017, and entitled "Method and Apparatus on Non-Codebook Based UL MIMO", which application is hereby incorporated herein by reference in its entirety.

TECHNICAL FIELD

The present disclosure relates generally to a system and method for selecting beams and determining a transmission rank for non-codebook based uplink (UL) multiple-input and multiple-output (MIMO) and, in particular, to a system and method for selecting UL precoders and determining transmission rank for non-codebook based UL MIMO transmission.

BACKGROUND

New Radio (NR) supports both codebook and non-codebook based uplink (UL) MIMO transmission. For codebook based UL MIMO, the transmission and reception point (TRP) measures uplink channels based on sounding reference signals (SRSs) sent by user equipment (UE) and determines the rank and the precoder for uplink transmission based on a predefined (standard related) codebook. After measuring the SRSs, the TRP indicates the rank and the precoder to the UE. For non-codebook based UL MIMO, no codebook is pre-specified in the specification of the 5G NR standard.

SUMMARY

In accordance with an embodiment of the present disclosure, a method implemented by a user equipment (UE) is disclosed. The method comprises receiving an allocation of at least one sounding reference signal (SRS) resource in an uplink subframe from a transmission and reception point (TRP) for a first set of uplink transmission beams, transmitting precoded SRSs in the at least one SRS resource to the TRP, wherein the precoded SRSs are precoded with UE-selected precoders and at least one rank and receiving an identification of two or more precoders for a second set of uplink transmission beams, wherein the second set of uplink transmission beams is selected from the first set of uplink transmission beams, and wherein the two or more precoders are based on the precoded SRSs.

In accordance with a further embodiment of the present disclosure, a method implement by a transmission and reception point (TRP) is disclosed. The method comprises sending an allocation of at least one sounding reference signal (SRS) resource in a uplink subframe to a user equipment (UE) for a first set of uplink transmission beams, receiving precoded SRSs sent in the at least one SRS resource, wherein the precoded SRSs are precoded with UE selected precoders and at least one rank and sending an identification of two or more precoders for a second set of uplink transmission beams to the UE, wherein the second set of uplink transmission beams is selected from the first set of uplink transmission beams, and wherein the two or more precoders for the uplink transmission beams are based on the precoded SRSs.

In accordance with yet a further embodiment of the present disclosure, a user equipment (UE) is disclosed. The UE includes a processor and a computer readable storage medium storing programming for execution by the processor, the programming including instructions to: receive an allocation of at least one sounding reference signal (SRS) resource in an uplink subframe from a transmission and reception point (TRP) for a first set of uplink transmission beams, transmit precoded SRSs in the at least one SRS resource to the TRP, wherein the precoded SRSs are precoded with UE-selected precoders and at least one rank and receive an identification of two or more precoders for a second set of uplink transmission beams, wherein the second set of uplink transmission beams is selected from the first set of uplink transmission beams, and wherein the two or more precoders are based on the precoded SRSs.

In accordance with another embodiment of the disclosure, a transmission and reception point (TRP) is disclosed. The TRP includes a processor and a computer readable storage medium storing programming for execution by the processor, the programming including instructions to: send an allocation of at least one sounding reference signal (SRS) resource in a uplink subframe to a user equipment (UE) for a first set of uplink transmission beams, receive precoded SRSs sent in the at least one SRS resource, wherein the precoded SRSs are precoded with UE selected precoders and at least one rank and send an identification of two or more precoders for a second set of uplink transmission beams to the UE, wherein the second set of uplink transmission beams is selected from the first set of uplink transmission beams, and wherein the two or more precoders for the uplink transmission beams are based on the precoded SRSs.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2 illustrates a flow chart for operating a UE according to an embodiment;

FIG. 3 illustrates a flow chart for operating a TRP according to an embodiment;

DETAILED DESCRIPTION OF ILLUSTRATIVE EMBODIMENTS

Figure 1A:
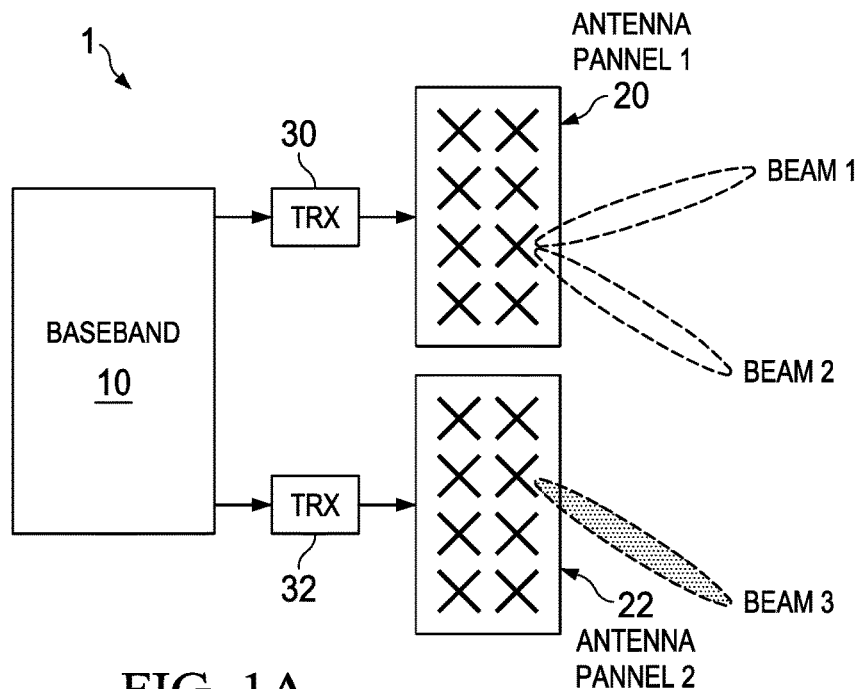
FIG. 1A shows a UE with two antenna panels configured to form various analog beams per panel.

Embodiments of the disclosure provide a method for beam selection according to a non-codebook based uplink (UL) multiple-input and multiple output (MIMO) transmission. Further embodiments provide a method wherein the transmission and reception point (TRP) determines the user equipment (UE) uplink beam combination based on UE input of UE selected precoders and rank(s). Yet other embodiments provide that the UE determines the precoders and the transmission rank(s) for a selected set of beams and the TRP indicates which of these beams or which combination of these beams are selected for uplink transmission. For example, the UE may precode a sounding reference signal (SRS) for each beam, wherein the SRS is based on a selected precoder and a selected rank for each beam individually. Alternatively, the UE may precode a SRS for each beam, wherein the SRS is based on a selected precoder for each beam, and wherein the rank for each beam is selected over all the selected beams. The precoders may be selected for physical uplink shared channel (PUSCH) transmissions. Alternatively, the precoders are selected for other type of transmissions.

Modern user equipment (UE) such as cellular phones, smart phones, tablet computers or other mobile devices may comprise a plurality of antenna panels and a plurality of transmission units (TRX) units. These UEs are able to form beams for directional signal transmission or reception.

While Release 8 of the LTE specification defines beamforming with one layer, Release 9 specifies dual-layer beamforming. This will permit the UE (or the TRP) to weight two layers individually at the antennas so that beamforming can be combined with spatial multiplexing for a TRP (or a UE). Release 10 defines beamforming for up to 8 layers so that eight physical transmit antenna may be needed.

A (spatial) layer is a data stream generated by the spatial multiplexer. The UE and the TRP may generate a plurality of different and independent data streams or layers per beam. A layer can be described as a mapping of symbols onto the transmit antenna ports. Each layer is identified by a precoding vector of size equal to the number of transmit antenna ports and can be associated with a radiation pattern.

An antenna port may be implemented either as a single physical transmit antenna, or as a combination of multiple physical antenna elements. In either case, the signal transmitted from each antenna port is not designed to be further deconstructed by the TRP receiver or the UE receiver. Each antenna panel may comprise at least one antenna port. In various embodiments each antenna panel comprises two or more antenna ports. For example, the antenna panel comprises 2, 4, 8 or more ports.

Since many different UEs are available nowadays and since these UEs have many different capabilities, the UE may report the capability to a transmission point or a transmission and reception point (TRP) such as a base station, an eNB or a gNB. The UE capability may be reported in an initial access to the TRP. The UE may report, in the initial access, capability information comprising the number of antenna panels, the number of TRX units, the number of concurrent analog beams to be formed by each panel, the number of spatial layers (e.g., streams) supported by each analog beam and the number of digital ports supported by each analog beam, etc. Alternatively, the UE may report the capability after the initial access is established.

However, this information may not be enough for the TRP to determine which UL transmission beams the UE may use for data transmission since not all analog beam combinations are allowed for simultaneous data transmission at the UE. Moreover, this information may not be enough for the TRP to allocate sounding reference signal (SRS) resource(s) for either the uplink beam management or the uplink channel acquisition. The SRS resource(s) may be a resource element or a group of resource elements configured to support sounding in an uplink subframe.

For example, as shown in FIG. 1A, the UE 1 has a baseband unit 10, two transmission units (TRX) 30, 32 and two antenna panels 20, 22. For antenna panel 20 two analog beams (beams 1 and 2) are identified and can be used for uplink transmission while for antenna panel 22 only one analog beam (beam 3) is identified and can be used for uplink transmission. The UE 1 may report these three beams to the TRP so that the TRP knows that it can use three beams for uplink transmission. However, only beams 1 and 3 or beams 2 and 3 can be used (multiplexed) together but not beams 1 and 2 to perform the transmission because each panel 20, 22 may have only one TRX 30, 32 respectively. In some embodiments, UE 1 reports also this information to the TRP.

Figure 1B:
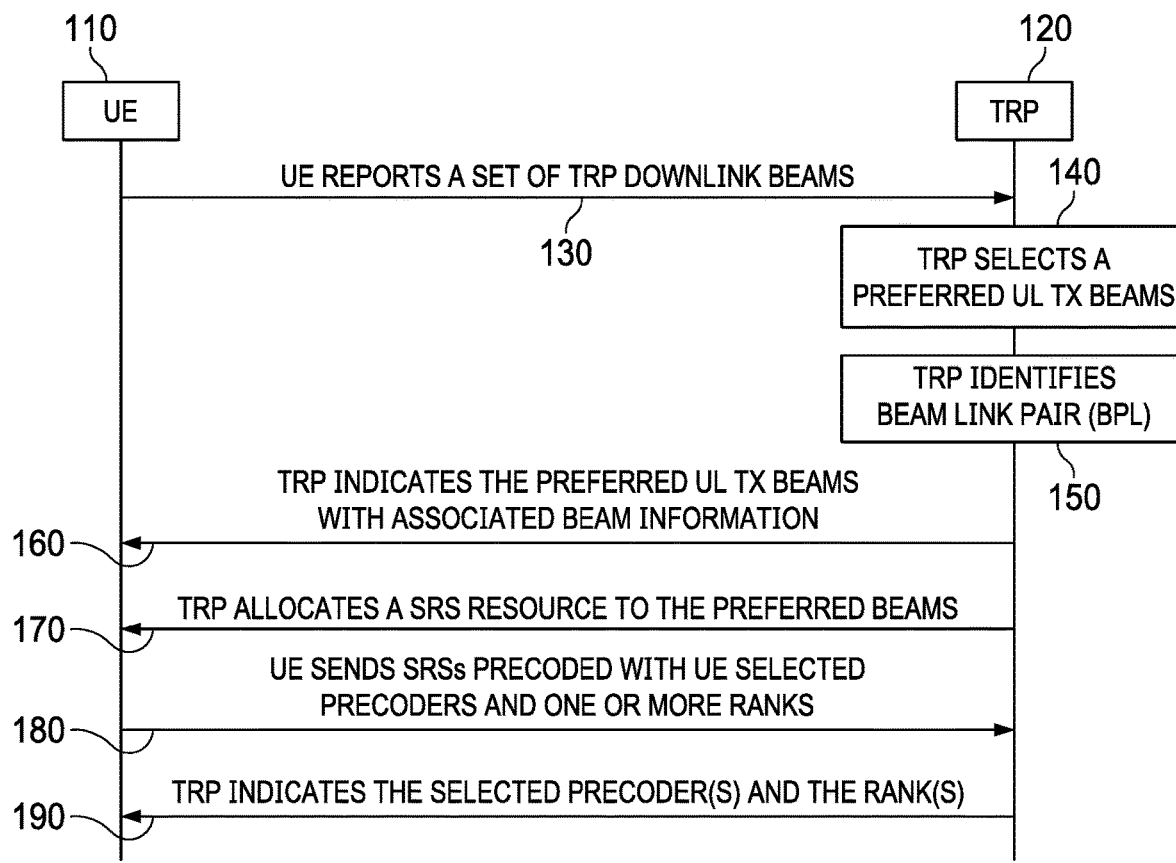
FIG. 1B shows a method for selecting UE UL beams/precoders and rank(s) for non-codebook based UL MIMO transmission according to an embodiment.

FIG. 1B shows method for selecting beams and acquiring channels for a non-codebook based uplink (UL) MIMO transmission 100. The method is a communication between a UE 110 and a TRP 120.

In step 130, for beam selection, the UE 110 reports a set of downlink (DL) Tx beams to the TRP 120. The set of DL Tx beams reported by the UE 110 may be a selection of all possible DL Tx beams. The set of DL Tx beams may be the best DL Tx beams measured. The UE 110 may measure metrics of the DL Tx beams to identify the best DL Tx beams. For example, the metric measured could be reference signal receive power (RSRP) for each DL Tx beam, a reference signal receive quality (RSRQ) for each DL Tx beam or both. Alternatively, the measured metric could be another signal quality receiving metric. The best DL Tx beams may be those with the highest receive power or the best receive quality. The UE 110 may determine the UL Tx beams based on downlink beam management and channel reciprocity. In other embodiments, the UE 110 and the TRP 120 may determine the UL Tx beams based on uplink beam management output. Additionally, the UE 110 may report possible combinations of UL Tx beams to the TRP 120. The UE 110 may further report information regarding UE capability such as a number of layers supported in each UL Tx beam to the TRP 120.

In step 140, the TRP 120 selects a subset of the UE UL Tx beams (preferred UE Tx beams) based on the set of UE reported TRP downlink beams (or based on uplink beam management output). The subset may be at least one of the reported UE beams or even all of the reported UE beams.

Optionally, in step 150, the TRP identifies beam pair links (BPLs) of UE Tx beams and TRP receiving beams (TRP Rx beams). The beam pair links are based on the subset of the UE uplink transmission beams identified by the TRP (preferred beams) and respective TRP receiving beams.

In step 160, the TRP 120 indicates to the UE 110 the selected beams, i.e., the subset of UE Tx beams (preferred or selected beams) from step 140 with associated TRP beam information, e.g., reference resource indicator (CRI), SRS resource indicator (SRI), etc. The indication can be signaled to the UE via higher layer signaling or via downlink control information (DCI).

In step 170, for channel acquisition, the TRP 120 allocates sounding reference signal (SRS) resources to the subset (preferred) UE transmission beams for UL channel state information (CSI) acquisition. For example, the TRP allocation may comprise sending a SRS configuration to the UE 110, wherein the SRS configuration includes time/frequency resources for SRS transmission and a SRS sequence to be used. The number of antenna ports for each SRS resource is according to UE capability. In one example, the UE 110 may be equipped with 2 antenna panels, each panel being connected to 2 transmission (TRX) units. Therefore, the UE can support up to two data layer transmission with each analog beam formed by each antenna panel. According to this UE capability, the TRP 120 may assign a SRS resource with two ports for each selected UE Tx beam, one for each TRX unit. Various SRS resource assignment options are discussed below. The allocation can be signaled to the UE via higher layer signaling or via downlink control information (DCI).

In one embodiment, the TRP 120 may allocate one SRS resource in an uplink subframe for the plurality of selected beams. The SRS resource comprises multiple ports. For example, the TRP 120 may allocate a 4-port SRS resource. For a UE 110 with 2 antenna panels and 2 TRX units, wherein each TRX unit is connected to a respective antenna panel, the UE 110 can then use two analog beams, each analog beam associated with two antenna ports to transmit the SRSs. This means that the SRS resource allocated to all beams is a single SRS resource and the same for all beams.

In an alternative embodiment, the TRP 120 may allocate multiple SRS resources in an uplink subframe so that one SRS resource is associated with one UE analog beam. Using the above example (two analog beams each associated with two antenna ports) each SRS resource may have two antenna ports. This means that a first SRS resource is allocated to the first beam and a second SRS resource is allocated to the second beam. Accordingly, the first resource is different than the second resource.

In yet another embodiment, the TRP 120 may allocate multiple SRS resources so that several SRS resources are associated with one analog beam. Each SRS resource has one antenna port which means that one analog beam may have several SRS resources. Using again the above example, each beam has two SRS resources allocated wherein each SRS resource has one antenna port. This means that a first resource and a second resource are allocated to the first beam and a third resource and a fourth resource is allocated to a second beam. Accordingly, the first-fourth resources are different.

Of course, the above mentioned embodiments can be combined. For example, two SRS resources (each having one port) may be allocated to one beam and one SRS resource (having two ports) may be allocated to the other beam.

In various embodiments, steps 160 and 170 may be performed separately or together.

In step 18o, in embodiments, the UE 110 sends UE specific SRSs precoded with UE selected precoders and rank(s) to the TRP 120. The UE 110 may determine the precoder and rank for each selected transmission beam.

The precoder and rank are determined based on downlink channel measurement, if channel reciprocity holds. The UE 110 measures the downlink channel based on a downlink reference signal. Given that downlink/uplink channel reciprocity holds, the UE 110 derives the precoders/rank based on downlink channel measurement for UL transmission. The rank may be between 1 (for one antenna port) and the maximum number of antenna ports the UE 110 supports and the maximum number of layers (data streams) that the UE 110 can transmit.

The precoder provides the precoding matrix the UE 110 applies for the uplink transmission beam. The precoding matrix may be applied for each beam individually. The precoding matrix applies a phase shift to the signals so that the signals received at the receiver are in-phase without any risk (or with minimized risk) of destructive interference or cancellation. Accordingly, the precoder selected is typically the precoder which provides the strongest signals at the receiver. The precoding matrix may vary across the downlink band in a similar way as the channel quality indicator (CQI).

The UE 110 may calculate the rank jointly with the precoder (precoding matrix) by choosing the combination that maximizes the expected downlink data rate (and, since channel reciprocity applies, uplink data rate).

Letting the UE select the precoders and the rank is advantageous because the selected non-codebook based precoders provide a high spatial resolution compared to the codebook based precoder. The UE 110 sends SRSs in the SRS resource(s) according to the determined precoders and rank(s) in the uplink transmission beams to the TRP 120.

The precoders and rank(s) can be reported explicitly or implicitly.

In one embodiment, the UE 110 may report the rank for each transmission beam in the uplink control channel. In another embodiment, UE 110 determines the rank and the precoder for each transmission beam and transmits the SRSs with the determined rank and precoder to the TRP 120. The TRP 120 can determine the precoders and the rank by detecting the SRS transmitted in each UE Tx beam.

In further embodiments, the UE 110 sends SRSs precoded with one or more UE selected precoder(s) and one single rank. The UE 110 determines the rank over all selected transmission beams and not for each beam individually. The precoders and the rank are determined based on downlink channel measurement, if channel reciprocity holds. This is advantageous because the selected non-codebook based precoder provides a high spatial resolution compared to the codebook based precoder. The UE 110 sends SRSs according to the determined precoders of the transmission beams and the one rank to the TRP 120.

For example, when the UE can form two analog beams and each beam has two antenna ports the UE may report explicitly or implicit the rank of 4. In one embodiment, the UE 110 may report the rank in the uplink control channel. In another embodiment, UE 110 determines the rank and precoder for each selected transmission beam and transmits the SRSs with the determined rank and precoders to the TRP 120. The UE 110 measures the downlink channel per beam and determines the ranks and precoders per beam for the uplink transmission. The TRP 120 can determine the precoders and the rank by detecting the SRS transmitted in each UE Tx beam.

In step 19o, the TRP 120 indicates the selected precoders and the rank(s) to the UE 110, e.g., by transmitting an uplink grant. In doing so the TRP 120 measures the SRSs in the beams. Beam/precoder selection is based on the measurements on the SRSs. In one embodiment, the TRP 120 determines the best UL beam/precoder and the best beam/precoder combination for all available (preferred or selected) UL transmission beams. For example, the TRP 120 evaluates or reviews the reported beams/precoders based on SRS measurements of channel quality, RSRP, RSRQ or a combination thereof. The TRP 120 further evaluates or reviews the reported rank for each beam. The TRP 120 may select the beams with the best channel qualities and the highest ranks for the beam combination. Alternatively, the TRP 120 may select the beams with the best RSRP or RSRQ and the highest ranks for the beam combination. In some embodiments not the best individual beams may be selected but a combination of beams providing the best (combined) metrics even though the beams individually do not provide the best beam metrics. The beam combination may include two or more beams, three or more beams, four or more beams, etc.

The TRP 120 also identifies the particular BPL between the TRP 120 and UE 110.

In various embodiments the UE 110 receives a selection of UL beams for UL PUSCH transmission from the TRP 120, wherein the selection may include co-phasing between the selected beams and the rank for each selected beam. For example, UE 110 is configured to send a 2-port SRS. The UE 110 selects a precoder for each port. After the TRP 120 receives this SRS the TRP 120 may find that it would be better to apply a co-phasing across those two ports on top of the precoders. The co-phasing is indicated (e.g., signaled) to the UE 110 and the UE 110 applies the co-phasing on top of the precoders in data transmission. The indicated rank is equal to or less than the rank implicitly (e.g., with SRS) or explicitly (e.g., with UL control channel) indicated by UE 110. If the rank of the selected beam is not indicated by the TRP 120, the UE assumes the rank for data transmission is the same as the rank used for sounding SRS transmission in each selected beam.

In further embodiments, the TRP 120 may provide two types of SRS resources. For beam selection/management, the TRP 120 may allocate SRS having a long duty cycle (e.g., transmit every several hundred milliseconds, e.g., 100, 200 or 500 milliseconds) and for channel state information (CSI) acquisition, the TRP 120 may allocate SRS having a short duty cycle (e.g., every 5, 10 or 20 milliseconds).

FIG. 2 illustrates a flow chart 200 for operating a user equipment (UE) according to an embodiment. In a first step, at 210, the UE reports a set of downlink (DL) TRP Tx beams to the TRP. The UE may also report a number of layers supported for UL Tx beams associated with the indicated beams. The reporting of the beams may be dynamic while the reporting of the number of layers may not be dynamic. Next, at 220, the UE receives an indication of preferred UL Tx beams (based on the set of DL TRP Tx beams) with associated TRP beam information from the TRP. The UL Tx beams can be identified by an associated TRP Tx beam ID which can be a channel state information resource index (CSI-RI or CRI). The indication can be signaled to the UE via higher layer signaling or via downlink control information (DCI). At 230, the UE further receives a SRS resource allocation for the preferred (or selected) UL Tx beams from the TRP. In one embodiment, each indicated UL beam is allocated with one or more SRS resources. In another embodiment, one SRS resource is allocated for all selected UL beams. The allocation can be signaled to the UE via higher layer signaling or via downlink control information (DCI).

At 240, the UE sends the SRSs precoded with UE selected precoders and rank(s) associated with the SRS resource(s) to the TRP. In one embodiment, the rank is determined by the UE for each selected UL beam. In another embodiment, the rank is determined by the UE over all selected UL beams. The rank may be reported to the TRP. In yet another embodiment, UE doesn't report the rank to the TRP. Rather, the TRP (blindly) detects the rank based on precoded SRS from the UE.

At 250, the UE receives an indication of the precoders and the rank(s) from the TRP. The rank can be signaled and the precoder can be indicated by an uplink grant. The precoders and the rank(s) are determined by the TRP from the UE selected precoders and rank(s). By determining the precoders and the rank(s) the TRP selects a proper uplink beam combination. The proper uplink beam combination may be the best possible beam combination for MIMO transmission. In one embodiment, the rank is not indicated by the TRP and the UE assumes the same rank as for the SRS used for the PUSCH transmission. Eventually, at 260, the UE transmits data (e.g., control data, user data, bearer data, etc.) using the selected precoders and rank(s), e.g., a selected beam combination.

FIG. 3 illustrates a flow chart 300 for operating a TRP according to an embodiment. In a first step, at 310, the TRP receives a report of a set of DL TRP Tx beam (e.g., CSI-RS resource indicators, etc.) from the UE and, optionally, a number of layers supported in the UL beams associated with the reported beams. The reporting of the beams is dynamic while the reporting of the number of layers may not be dynamic. Next, at 320, the TRP indicates preferred UL Tx beams (based on a subset of DL TRP Tx beams) with associated TRP beam information to the UE. The UL Tx beams can be identified by an associated TRP Tx beam ID which can be a CSI-RI (CRI). The indication can be signaled to the UE via higher layer signaling or via downlink control information (DCI). At 330, the TRP further sends a SRS resource allocation for the subset of the UL Tx beams to the UE. In one embodiment, one SRS resource is allocated to all uplink beams. In another embodiment, one SRS resource is allocated to one uplink beam. In yet another embodiment, several SRS resources are allocated to an uplink beam. At 340, the TRP receives SRSs precoded with UE selected precoders and rank(s). In one embodiment, the rank is determined by UE for each selected UL beam. In another embodiment, the rank is determined by the UE over all selected UL beams. In yet another embodiment, UE doesn't report the rank to the TRP. Rather, the TRP (blindly) detects the rank based on precoded SRS from UE. At 350, the TRP indicates a precoder and a rank to the UE. The precoders and the rank(s) are determined by the TRP from the UE selected precoders and rank(s). By determining the precoders and the rank(s) the TRP selects a proper uplink beam combination for MIMO transmission. The proper uplink beam combination may be the best possible beam combination. Eventually, at 360, the TRP receives data (e.g., control data, user data, bearer data, etc.) based on the selected precoders and rank(s) from the UE, e.g., a selected beam combination.

Figure 4:
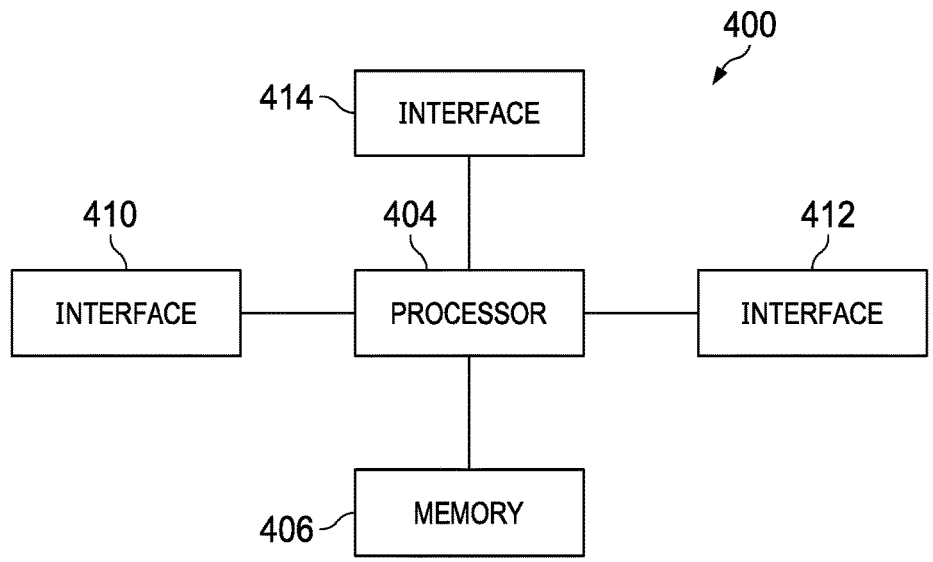
FIG. 4 illustrates a block diagram of a processing system for performing embodiment methods described herein according to an embodiment.

FIG. 4 illustrates a block diagram of an embodiment processing system 400 for performing methods described herein, which may be installed in a TRP or a UE. As shown, the processing system 400 includes a processor 404, a memory 406, and interfaces 410-414, which may (or may not) be arranged as shown in FIG. 4. The processor 404 may be any component or collection of components adapted to perform computations and/or other processing related tasks, and the memory 406 may be any component or collection of components adapted to store programming and/or instructions for execution by the processor 404. In an embodiment, the memory 406 includes a non-transitory computer readable medium. The interfaces 410, 412, 414 may be any component or collection of components that allow the processing system 400 to communicate with other devices/components and/or a user. For example, one or more of the interfaces 410, 412, 414 may be adapted to communicate data, control, or management messages from the processor 404 to applications installed on the UE and/or a remote device. As another example, one or more of the interfaces 410, 412, 414 may be adapted to allow a user or user device (e.g., hand held device, etc.) to interact/communicate with the processing system 400. The processing system 400 may include additional components not depicted in FIG. 4, such as long term storage (e.g., non-volatile memory, etc.). In some embodiments, at least one of the interfaces 410, 412, 414 may be a wireless to air interface, in other embodiments none of the interfaces 410, 412, 413 are wireless interfaces.

In some embodiments, the processing system 400 is included in a network device that is accessing, or part otherwise of, a telecommunications network. In one example, the processing system 400 is in a network-side device in a wireless or wireline telecommunications network, such as a base station, a relay station, a scheduler, a controller, a gateway, a router, an applications server, or any other device in the telecommunications network. In other embodiments, the processing system 400 is in a user-side device accessing a wireless or wireline telecommunications network, such as a mobile station, a smart phone, a user equipment (UE), a personal computer (PC), a tablet, a wearable communications device (e.g., a smartwatch, etc.), or any other device adapted to access a telecommunications network.

In some embodiments, one or more of the interfaces 410, 412, 414 connects the processing system 400 to a transceiver adapted to transmit and receive signaling over the telecommunications network.

Figure 5:
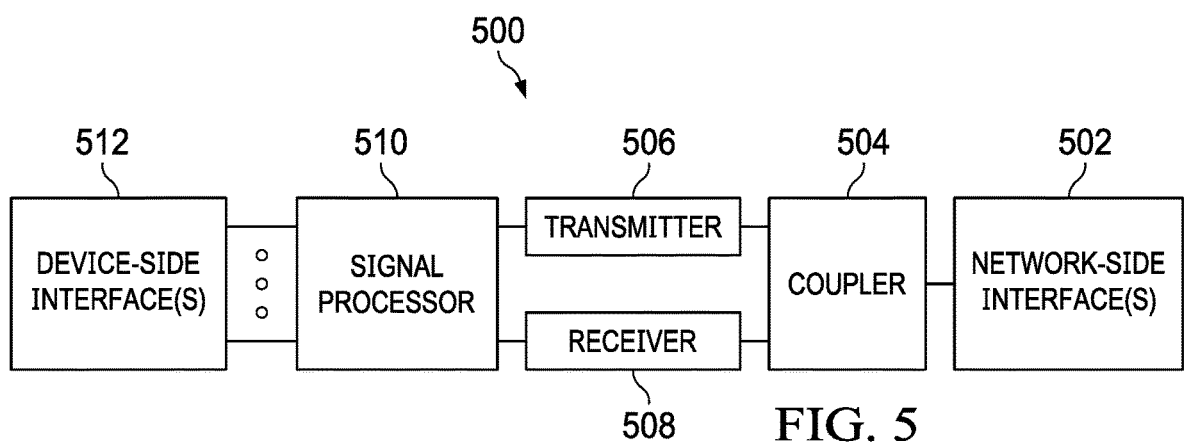
FIG. 5 illustrates a block diagram of a transceiver adapted to transmit and receive signaling over a telecommunications network according to an embodiment.

FIG. 5 illustrates a block diagram of a transceiver 500 adapted to transmit and receive signaling over a telecommunications network. The transceiver 500 may be installed in a TRP or in a UE. As shown, the transceiver 500 comprises a network-side interface 502, a coupler 504, a transmitter 506, a receiver 508, a signal processor 510, and a device-side interface 512. The network-side interface 502 may include any component or collection of components adapted to transmit or receive signaling over a wireless or wireline telecommunications network. The coupler 504 may include any component or collection of components adapted to facilitate bi-directional communication over the network-side interface 502. The transmitter 50o6 may include any component or collection of components (e.g., up-converter, power amplifier, etc.) adapted to convert a baseband signal into a modulated carrier signal suitable for transmission over the network-side interface 502. The receiver 50o8 may include any component or collection of components (e.g., down-converter, low noise amplifier, etc.) adapted to convert a carrier signal received over the network-side interface 502 into a baseband signal. The signal processor 510 may include any component or collection of components adapted to convert a baseband signal into a data signal suitable for communication over the device-side interface(s) 512, or vice-versa. The device-side interface(s) 512 may include any component or collection of components adapted to communicate data-signals between the signal processor 510 and components within the host device (e.g., the processing system 400, local area network (LAN) ports, etc.).

The transceiver 500 may transmit and receive signaling over any type of communications medium. In some embodiments, the transceiver 500 transmits and receives signaling over a wireless medium. For example, the transceiver 500 may be a wireless transceiver adapted to communicate in accordance with a wireless telecommunications protocol, such as a cellular protocol (e.g., 5G or long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 502 comprises one or more antenna/radiating elements. For example, the network-side interface 502 may include multiple separate antennas or a multi-antenna array configured for multi-layer communication, e.g., multiple input multiple output (MIMO), etc. In other embodiments, the transceiver 500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following embodiments and aspects of the disclosure and can be combined in all possible combinations and permutations.

In a first embodiment a method implement by a user equipment is disclosed. The method includes receiving an allocation of at least one sounding reference signal (SRS) resource in an uplink subframe from a transmission and reception point (TRP) for a first set of uplink transmission beams, transmitting precoded SRSs in the at least one SRS resource to the TRP, wherein the precoded SRSs are precoded with UE-selected precoders and at least one rank and receiving an identification of two or more precoders for a second set of uplink transmission beams, wherein the second set of uplink transmission beams is selected from the first set of uplink transmission beams, and wherein the two or more precoders are based on the precoded SRSs.

According to a first aspect of this embodiment the at least one SRS resource is a single SRS resource comprising a plurality of antenna ports corresponding to the uplink transmission beams.

According to a second aspect of this embodiment the at least one SRS resource comprises at least one SRS resource for each uplink transmission beam, and wherein the at least one SRS resource includes at least one antenna port.

According to a third aspect of this embodiment the at least one SRS resource comprises a plurality of SRS resources for each uplink transmission beam, and wherein each SRS resource has at least one SRS antenna port.

According to a fourth aspect of this embodiment transmitting the precoded SRSs comprises transmitting the precoded SRSs with a UE-selected single rank, and wherein the single rank is determined by the UE over all selected uplink transmission beams.

According to a fifth aspect of this embodiment transmitting the precoded SRSs comprises transmitting the precoded SRSs with a plurality of UE-selected ranks.

According to a sixth aspect of this embodiment the first set of uplink transmission beams is selected from a third set of uplink transmission beams reported to the TRP by the UE.

According to a seventh aspect of this embodiment a precoder and a rank for each uplink transmission beam are determined based on downlink channel estimation and channel reciprocity.

According to an eighth aspect of this embodiment the method further comprises receiving co-phasing between selected antenna ports from the TRP.

In a second embodiment a method implement by a transmission and reception point (TRP) is disclosed. The method includes sending an allocation of at least one sounding reference signal (SRS) resource in a uplink subframe to a user equipment (UE) for a first set of uplink transmission beams, receiving precoded SRSs sent in the at least one SRS resource, wherein the precoded SRSs are precoded with UE selected precoders and at least one rank; and sending an identification of two or more precoders for a second set of uplink transmission beams to the UE, wherein the second set of uplink transmission beams is selected from the first set of uplink transmission beams, and wherein the two or more precoders for the uplink transmission beams are based on the precoded SRSs.

According to a first aspect of this embodiment the at least one SRS resource is a single SRS resource comprising a plurality of antenna ports corresponding to the uplink transmission beams.

According to a second aspect of this embodiment the at least one SRS resource comprises at least one SRS resource for each uplink transmission beam, and wherein the at least one SRS resource includes at least one antenna port.

According to a third aspect of this embodiment the at least one SRS resource comprises a plurality of SRS resources for each uplink transmission beam, and wherein each SRS resource has at least one SRS antenna port.

According to a fourth aspect of this embodiment receiving the SRSs comprises receiving the SRSs with a single UE-selected rank, and wherein the single rank is determined by the UE over all selected UL transmission beams.

According to a fifth aspect of this embodiment receiving comprises receiving the SRSs with a plurality of UE-selected selected ranks.

According to a sixth aspect of this embodiment the first set of uplink transmission beams is selected from a third set of uplink transmission beams reported to the TRP by the UE.

According to a seventh aspect of this embodiment a precoder and a rank for each selected uplink transmission beam is based on downlink channel estimation and channel reciprocity.

According to an eighth aspect of this embodiment the method further comprises sending co-phasing between selected antenna ports from the TRP.

In a third embodiment a user equipment (UE) is disclosed. The UE includes a processor and a computer readable storage medium storing programming for execution by the processor, the programming including instructions to receive an allocation of at least one sounding reference signal (SRS) resource in an uplink subframe from a transmission and reception point (TRP) for a first set of uplink transmission beams, transmit precoded SRSs in the at least one SRS resource to the TRP, wherein the precoded SRSs are precoded with UE-selected precoders and at least one rank and receive an identification of two or more precoders for a second set of uplink transmission beams, wherein the second set of uplink transmission beams is selected from the first set of uplink transmission beams, and wherein the two or more precoders are based on the precoded SRSs.

According to a first aspect of this embodiment the at least one SRS resource is a single SRS resource comprising a plurality of antenna ports corresponding to the uplink transmission beams.

According to a second aspect of this embodiment the at least one SRS resource comprises at least one SRS resource for each uplink transmission beam, and wherein the at least one SRS resource includes at least one antenna port.

According to a third aspect of this embodiment the at least one SRS resource comprises a plurality of SRS resources for each uplink transmission beam, and wherein each SRS resource has at least one SRS antenna port.

According to a fourth aspect of this embodiment the instruction to transmit the precoded SRSs comprises the instruction to transmit the precoded SRSs with a UE-selected single rank, and wherein the single rank is determined by the UE over all selected uplink transmission beams.

According to a fifth aspect of this embodiment the instructions to transmit the precoded SRSs comprises the instructions to transmit the precoded SRSs with a plurality of UE-selected ranks.

According to a sixth aspect of this embodiment the first set of uplink transmission beams is selected from a third set of uplink transmission beams reported to the TRP by the UE.

According to a seventh aspect of this embodiment a precoder and a rank for each uplink transmission beam are determined based on downlink channel estimation and channel reciprocity.

According to an eighth aspect of this embodiment the UE further comprises the instructions to receive co-phasing between selected antenna ports from the TRP.

In a fourth embodiment a transmission and reception point (TRP) is disclosed. The TRP includes a processor and a computer readable storage medium storing programming for execution by the processor, the programming including instructions to send an allocation of at least one sounding reference signal (SRS) resource in a uplink subframe to a user equipment (UE) for a first set of uplink transmission beams, receive precoded SRSs sent in the at least one SRS resource, wherein the precoded SRSs are precoded with UE selected precoders and at least one rank and send an identification of two or more precoders for a second set of uplink transmission beams to the UE, wherein the second set of uplink transmission beams is selected from the first set of uplink transmission beams, and wherein the two or more precoders for the uplink transmission beams are based on the precoded SRSs.

According to a first aspect of this embodiment the at least one SRS resource is a single SRS resource comprising a plurality of antenna ports corresponding to the uplink transmission beams.

According to a second aspect of this embodiment the at least one SRS resource comprises at least one SRS resource for each uplink transmission beam, and wherein the at least one SRS resource includes at least one antenna port.

According to a third aspect of this embodiment the at least one SRS resource comprises a plurality of SRS resources for each uplink transmission beam, and wherein each SRS resource has at least one SRS antenna port.

According to a fourth aspect of this embodiment the instructions to receive the SRSs comprises the instructions to receive the SRSs with a single UE-selected rank, and wherein the single rank is determined by the UE over all selected UL transmission beams.

According to a fifth aspect of this embodiment the instructions to receive the SRSs comprises the instructions to receive the SRSs with a plurality of UE-selected selected ranks.

According to a sixth aspect of this embodiment the first set of uplink transmission beams is selected from a third set of uplink transmission beams reported to the TRP by the UE.

According to a seventh aspect of this embodiment a precoder and a rank for each selected uplink transmission beam is based on downlink channel estimation and channel reciprocity.

According to an eighth aspect of this embodiment the TRP further comprises the instructions to send co-phasing between selected antenna ports from the TRP.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method implemented by a user equipment (UE), the method comprising:
receiving an allocation of at least one sounding reference signal (SRS) resource in an uplink subframe from a transmission and reception point (TRP) for a first set of uplink transmission beams;

transmitting precoded SRSs in the at least one SRS resource to the TRP, wherein the precoded SRSs are precoded with UE-selected precoders and at least one rank; and receiving an identification of one or more precoders for a second set of uplink transmission beams, wherein the second set of uplink transmission beams is selected from the first set of uplink transmission beams, and wherein the one or more precoders are based on the precoded SRSs.

2. The method of claim 1, wherein the at least one SRS resource is a single SRS resource comprising a plurality of antenna ports corresponding to the second set of uplink transmission beams.

3. The method of claim 1, wherein the at least one SRS resource comprises at least one SRS resource for each uplink transmission beam, and wherein the at least one SRS resource includes at least one antenna port.

4. The method of claim 1, wherein the at least one SRS resource comprises a plurality of SRS resources for each uplink transmission beam, and wherein each SRS resource has at least one SRS antenna port.

5. The method of claim 1, wherein transmitting the precoded SRSs comprises transmitting the precoded SRSs with a single UE-selected rank, and wherein the single UE-selected rank is determined by the UE over all selected uplink transmission beams.

6. The method of claim 1, wherein transmitting the precoded SRSs comprises transmitting the precoded SRSs with a plurality of UE-selected ranks.

7. The method of claim 1, wherein the first set of uplink transmission beams is selected from a third set of uplink transmission beams reported to the TRP by the UE.

8. The method of claim 1, wherein a precoder and a rank for each uplink transmission beam are determined based on downlink channel estimation and channel reciprocity.

9. The method of claim 1, further comprising receiving co-phasing between selected antenna ports from the TRP.

10. A method implemented by a transmission and reception point (TRP), the method comprising:

sending an allocation of at least one sounding reference signal (SRS) resource in a uplink subframe to a user equipment (UE) for a first set of uplink transmission beams;

receiving precoded SRSs sent in the at least one SRS resource, wherein the precoded SRSs are precoded with UE selected precoders and at least one rank; and sending an identification of one or more precoders for a second set of uplink transmission beams to the UE, wherein the second set of uplink transmission beams is selected from the first set of uplink transmission beams, and wherein the one or more precoders for the second set of uplink transmission beams are based on the precoded SRSs.

11. The method of claim 10, wherein the at least one SRS resource is a single SRS resource comprising a plurality of antenna ports corresponding to the second set of uplink transmission beams.

12. The method of claim 10, wherein the at least one SRS resource comprises at least one SRS resource for each uplink transmission beam, and wherein the at least one SRS resource includes at least one antenna port.

13. The method of claim 10, wherein the at least one SRS resource comprises a plurality of SRS resources for each uplink transmission beam, and wherein each SRS resource has at least one SRS antenna port.

14. The method of claim 10, wherein receiving the SRSs comprises receiving the SRSs with a single UE-selected rank, and wherein the single UE-selected rank is determined by the UE over all selected UL transmission beams.

15. The method of claim 10, wherein receiving the SRSs comprises receiving the SRSs with a plurality of UE-selected selected ranks.

16. The method of claim 10, wherein the first set of uplink transmission beams is selected from a third set of uplink transmission beams reported to the TRP by the UE.

17. The method of claim 10, wherein a precoder and a rank for each selected uplink transmission beam is based on downlink channel estimation and channel reciprocity.

18. The method of claim 10, further comprising sending co-phasing between selected antenna ports from the TRP.

19. A user equipment (UE) comprising:
a processor; and
a non-transitory computer readable storage medium storing programming for execution by the processor, the programming including instructions to:
receive an allocation of at least one sounding reference signal (SRS) resource in an uplink subframe from a transmission and reception point (TRP) for a first set of uplink transmission beams;
transmit precoded SRSs in the at least one SRS resource to the TRP, wherein the precoded SRSs are precoded with UE-selected precoders and at least one rank; and
receive an identification of one or more precoders for a second set of uplink transmission beams, wherein the second set of uplink transmission beams is selected from the first set of uplink transmission beams, and wherein the one or more precoders are based on the precoded SRSs.

20. A transmission and reception point (TRP) comprising:
a processor; and
a non-transitory computer readable storage medium storing programming for execution by the processor, the programming including instructions to:
send an allocation of at least one sounding reference signal (SRS) resource in a uplink subframe to a user equipment (UE) for a first set of uplink transmission beams;
receive precoded SRSs sent in the at least one SRS resource, wherein the precoded SRSs are precoded with UE selected precoders and at least one rank; and
send an identification of one or more precoders for a second set of uplink transmission beams to the UE, wherein the second set of uplink transmission beams is selected from the first set of uplink transmission beams, and wherein the one or more precoders for the second set of uplink transmission beams are based on the precoded SRSs.

21. The method of claim 1, further comprising transmitting data based on the one or more precoders.

22. The method of claim 10, further comprising receiving data based on the one or more precoders.

* * * * *